(12) United States Patent
Kwon et al.

(10) Patent No.: US 8,588,153 B2
(45) Date of Patent: Nov. 19, 2013

(54) METHOD AND APPARATUS FOR TRANSMITTING UPLINK CONTROL CHANNEL IN A MOBILE COMMUNICATION SYSTEM

(75) Inventors: Hwan-Joon Kwon, Suwon-si (KR); Joon-Young Cho, Suwon-si (KR); Jin-Kyu Han, Seoul (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 828 days.

(21) Appl. No.: 12/665,886

(22) PCT Filed: Jun. 20, 2008

(86) PCT No.: PCT/KR2008/003535
§ 371 (c)(1),
(2), (4) Date: Dec. 21, 2009

(87) PCT Pub. No.: WO2008/156338
PCT Pub. Date: Dec. 24, 2008

(65) Prior Publication Data
US 2010/0329196 A1    Dec. 30, 2010

(30) Foreign Application Priority Data
Jun. 20, 2007 (KR) .................. 10-2007-0060482

(51) Int. Cl.
*H04W 28/04* (2009.01)
*H04W 72/04* (2009.01)
*H04W 88/08* (2009.01)

(52) U.S. Cl.
USPC ............ 370/329; 370/310; 370/328; 370/330

(58) Field of Classification Search
None
See application file for complete search history.

(56) References Cited

U.S. PATENT DOCUMENTS

| | | | |
|---|---|---|---|
| 6,647,000 B1* | 11/2003 | Persson et al. ............... | 370/330 |
| 2004/0095880 A1* | 5/2004 | Laroia et al. .................. | 370/208 |
| 2006/0013185 A1* | 1/2006 | Seo et al. ....................... | 370/343 |
| 2006/0056360 A1* | 3/2006 | Parkvall et al. ............... | 370/335 |
| 2006/0203932 A1* | 9/2006 | Palanki et al. ................ | 375/295 |
| 2008/0090528 A1* | 4/2008 | Malladi .......................... | 455/70 |
| 2008/0232449 A1* | 9/2008 | Khan et al. .................... | 375/220 |
| 2008/0233964 A1* | 9/2008 | McCoy et al. ................. | 455/450 |
| 2008/0267137 A1* | 10/2008 | Dabak et al. ................... | 370/336 |
| 2008/0273513 A1* | 11/2008 | Montojo et al. ............... | 370/342 |

(Continued)

OTHER PUBLICATIONS

The Effects of the Sub-carrier Grouping on Multi-Carrier Channel Aware Scheduling Fanchun Jin, et al; Oct. 2004.

(Continued)

*Primary Examiner* — Hassan Phillips
*Assistant Examiner* — Gautam Sharma
(74) *Attorney, Agent, or Firm* — The Farrell Law Firm, P.C.

(57) ABSTRACT

A method for transmitting an uplink control channel at a terminal in a Single Carrier Frequency Division Multiple Access (SC-FDMA)-based mobile communication system is provided. The transmission method includes receiving a control channel index allocated from a base station; transmitting control information at every symbol through a subband and a Zadoff-Chue sequence offset resource, which are mapped to the control channel index according to a first grouping rule; and transmitting control information through a subband and a Zadoff-Chue sequence offset resource, which are mapped to the control channel index according to a second grouping rule, beginning from a symbol after a slot boundary.

12 Claims, 9 Drawing Sheets

(56) References Cited

U.S. PATENT DOCUMENTS

| | | | |
|---|---|---|---|
| 2008/0310383 A1* | 12/2008 | Kowalski | 370/342 |
| 2009/0046674 A1* | 2/2009 | Gao et al. | 370/337 |
| 2009/0073922 A1* | 3/2009 | Malladi et al. | 370/328 |
| 2009/0129259 A1* | 5/2009 | Malladi et al. | 370/210 |
| 2009/0316647 A1* | 12/2009 | Chen et al. | 370/330 |
| 2010/0067461 A1* | 3/2010 | Kwak et al. | 370/329 |
| 2010/0098005 A1* | 4/2010 | Lee et al. | 370/329 |
| 2010/0329220 A1* | 12/2010 | Kim et al. | 370/336 |
| 2011/0122922 A1* | 5/2011 | Eriksson Lowenmark et al. | 375/135 |
| 2011/0182266 A1* | 7/2011 | Iwai et al. | 370/329 |

OTHER PUBLICATIONS

Investigations on Random Access Channel Structure in Evolved UTRA Uplink Kishiyama et al. 1-4244-0398-7/06.

* cited by examiner

METHOD AND APPARATUS FOR TRANSMITTING UPLINK CONTROL CHANNEL IN A MOBILE COMMUNICATION SYSTEM

BACKGROUND OF THE INVENTION

1. Field of the Invention

The present invention relates generally to a mobile communication system, and in particular, to a method and apparatus for transmitting uplink control channels.

2. Description of the Related Art

Recently, in mobile communication systems, a discussion is being held on a technology of applying Single Carrier Frequency Division Multiple Access (SC-FDMA) in the uplink, which is a transmission link from a terminal (or a User Equipment (UE)) to a base station (or Node B).

Figure 1:
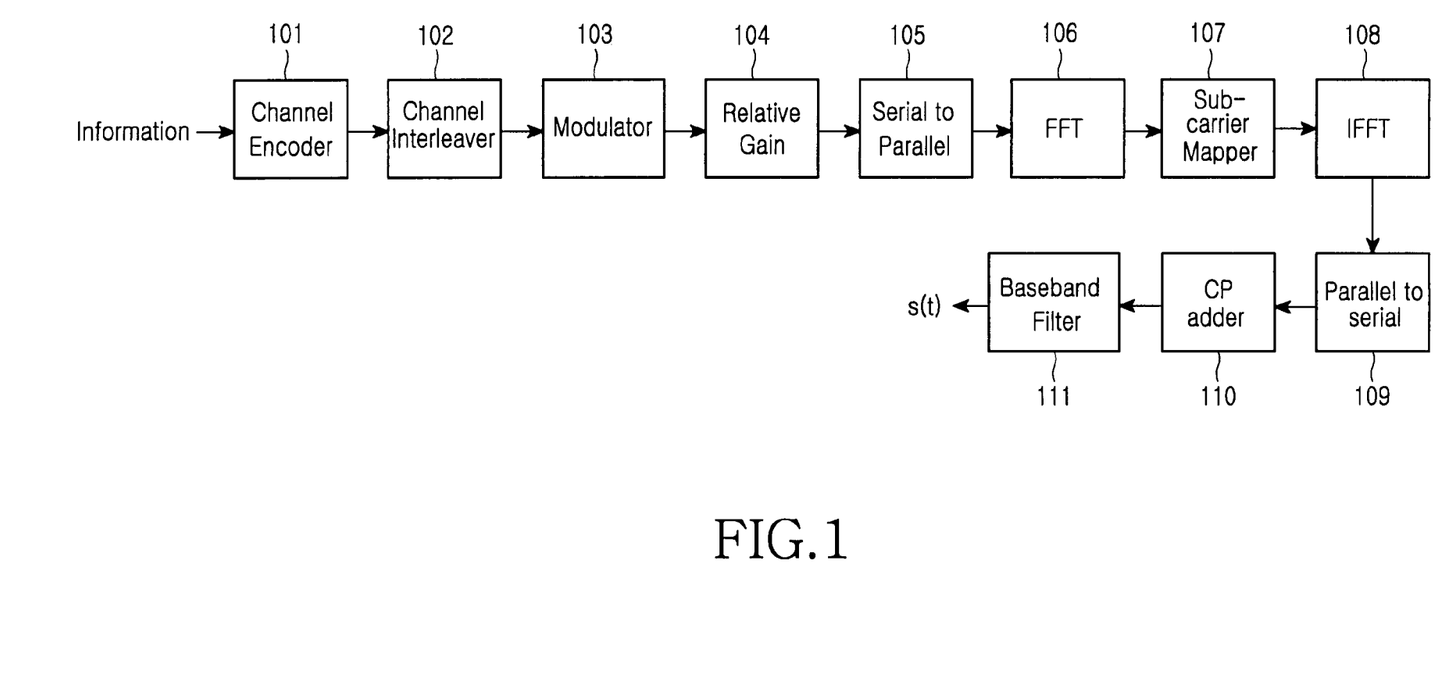
FIG. 1 is a block diagram illustrating an internal structure of a transmitter for implementing SC-FDMA in a frequency domain according to the prior art.

FIG. 1 is a block diagram illustrating an internal structure of a transmitter for implementing SC-FDMA in a frequency domain according to the prior art.

Referring to FIG. 1, a channel encoder 101 performs a specific channel encoding process on an input information bit stream. A block encoder, a convolutional encoder, a turbo encoder or a Low Density Parity Check (LDPC) encoder can be used as the channel encoder 101. A channel interleaver 102 performs specific channel interleaving on the input signal output from the channel encoder 101. Although omitted in FIG. 1, a rate matching block composed of a repeater and a puncturer can be interposed between the channel encoder 101 and the channel interleaver 102.

A modulator 103 performs a modulation process, such as Quadrature Phase Shift Keying (QPSK), 8-ary Phase Shift Keying (8PSK), 16-ary Q Quadrature Amplitude Modulation (16QAM), etc., on the input signal output from the channel interleaver 102. The output signal of the modulator 103 is multiplied by a gain corresponding to each physical layer channel according to a predetermined rule by means of a relative gain unit 104. A serial-to-parallel converter 105 converts the serial signal output from the relative gain unit 104 into a parallel signal. The output of the serial-to-parallel converter 105 undergoes Fast Fourier Transform (FFT) by means of an FFT unit 106. A sub-carrier mapper 107 maps the FFT-transformed signal to sub-carriers according to a predetermined rule so that a signal of the terminal should occupy only a particular frequency. An Inverse Fast Fourier Transform (IFFT) unit 108 IFFT-transforms the signal output from the sub-carrier mapper 107, and a parallel-to-serial converter 109 converts the parallel signal output from the IFFT unit 108 into a serial signal. A CP adder 110 adds a Cyclic Prefix (CP) to the signal output from the parallel-to-serial converter 109 according a predetermined rule, and the CP-added signal passes through a baseband filter 111, generating a final baseband signal s(t).

Figure 2:
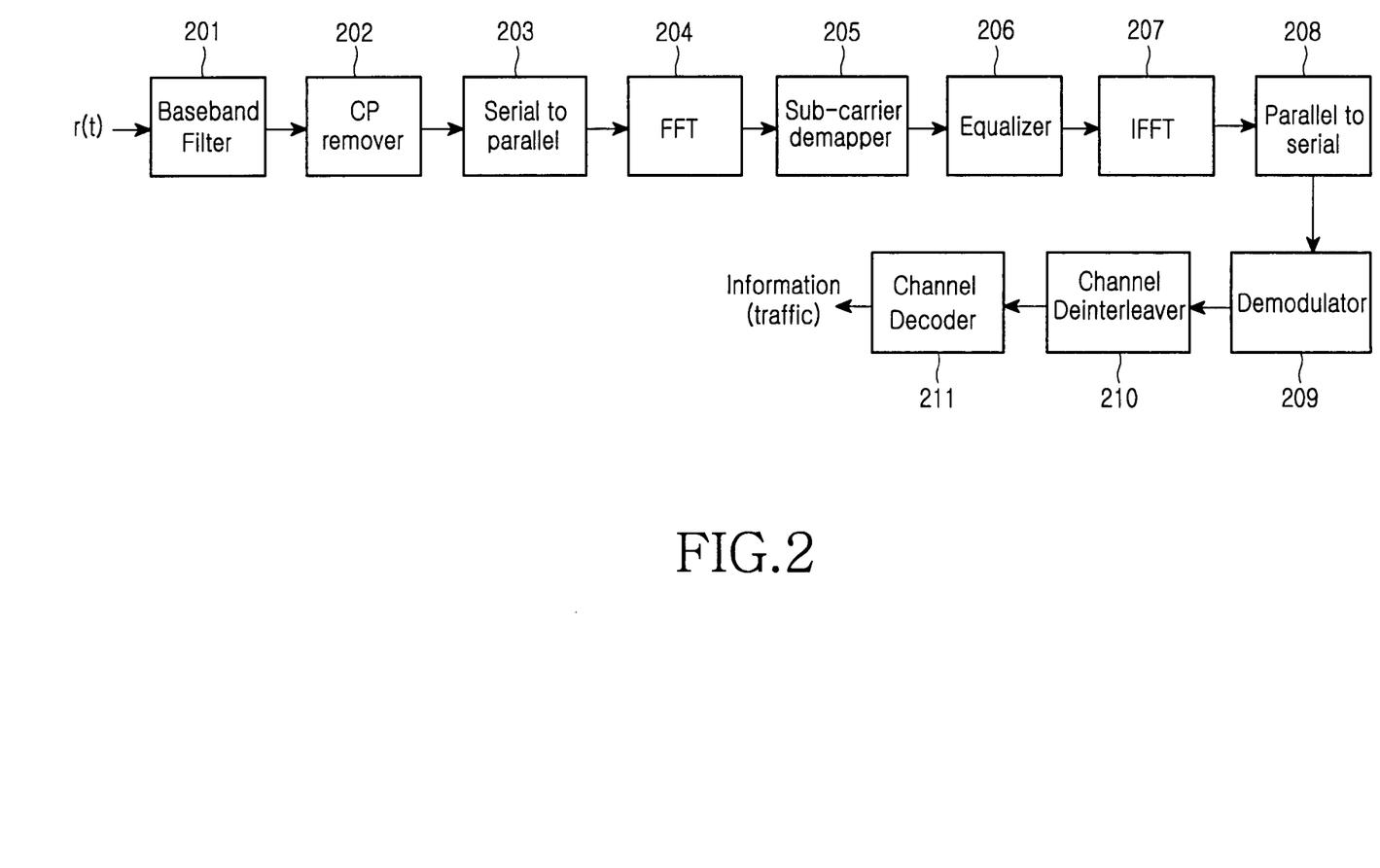
FIG. 2 is a block diagram illustrating an internal structure of a receiver for implementing SC-FDMA in a frequency domain according to the prior art.

FIG. 2 is a block diagram illustrating an internal structure of a receiver for implementing SC-FDMA in a frequency domain.

Referring to FIG. 2, a received signal r(t) is output through a baseband filter 201. Generally, the baseband filter 201 makes a pair with the baseband filter 111 of FIG. 1. The output of the baseband filter 201 is input to a CP remover 202 where a CP part is removed therefrom according to a predetermined rule. The CP-removed serial signal is input to a serial-to-parallel converter 203 where it is converted into a parallel signal. The output of the serial-to-parallel converter 203 undergoes FFT transform in an FFT unit 204, and then input to a sub-carrier demapper 205. The sub-carrier demapper 205 extracts sub-carriers mapped by the sub-carrier mapper 107 of FIG. 1. The extracted sub-carriers are input to a channel equalizer 206 where they undergo a predetermined channel equalization process. Although the channel equalization process includes various possible methods, a detailed description thereof will be omitted herein since the channel equalization methods are not the gist of the present invention. The output of the channel equalizer 206 passes through an IFFT unit 207, and then input to a parallel-to-serial converter 208 where it is converted into a serial signal. The serial signal is input to a demodulator 209 where it undergoes a predetermined demodulation process corresponding to 16QAM, 8PSK, QPSK, etc. The output of the demodulator 209 is input to a channel deinterleaver 210 where it undergoes a predetermined deinterleaving process. The output of the channel deinterleaver 210 is input to a channel decoder 211 where it undergoes a predetermined channel decoding process, detecting final information.

Figure 3:
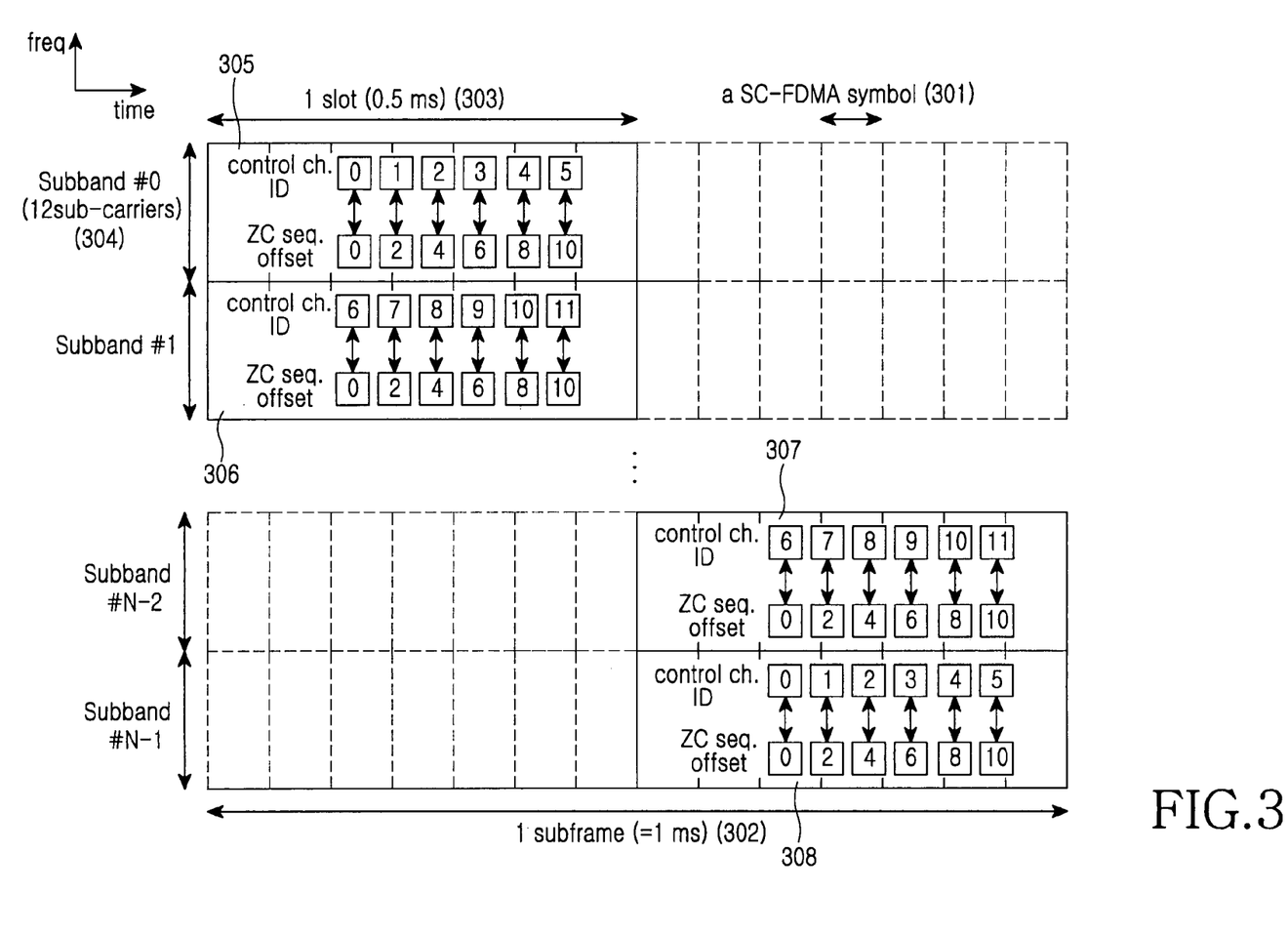
FIG. 3 is a diagram illustrating a scheme for transmitting control channels in an SC-FDMA based system according to the prior art.

FIG. 3 is a diagram illustrating a scheme for transmitting control channels in an SC-FDMA based system according to the prior art. In FIG. 3, the horizontal axis represents the time domain, and the vertical axis represents the frequency domain.

One SC-FDMA symbol denoted by reference numeral 301 is a symbol generated according to the operation described in FIG. 1, i.e., one CP-added symbol, and it corresponds to an Orthogonal Frequency Division Multiplexing (OFDM) symbol in the normal OFDM system. The SC-FDMA symbol 301 is also called an SC-FDMA block. Reference numeral 302 represents one subframe. The subframe 302 is a time unit in which one packet of data or control information is transmitted, and it corresponds to 1 ms. The subframe 302 is composed of 14 SC-FDMA symbols 301. One slot denoted by reference numeral 303 is 0.5 ms corresponding to a half of the subframe 302, and it is composed of 7 SC-FDMA symbols 301. One subband denoted by reference numeral 304 is a basic unit for resource allocation in the frequency domain, and it is composed of 12 sub-carriers in this system. In FIG. 3, the system is composed of N subbands.

Reference numerals 305 to 308 show a detailed method in which control information is transmitted. The control information corresponds to information such as Channel Quality Indicator (CQI), Acknowledge (ACK)/Negative ACK (NACK), etc. Reference numerals 305 to 308 show how resources such as frequency, code, time, etc. are used in transmitting the control information. Shown by reference numeral 305 is an occasion where a control channel index (control channel ID) #0 is transmitted using time resources corresponding to 7 SC-FDMA symbols of the first slot, using code resource of a Zadoff-Chue (ZC) sequence offset #0, and using frequency resource corresponding to a subband #0. In addition, shown by reference numeral 308 is an occasion where the control channel index (control channel ID) #0 is transmitted using time resources corresponding to 7 SC-FDMA symbols of the second slot, using code resource of a ZC sequence offset #0, and using frequency resource corresponding to a subband #(N−1).

Changing the subband at the slot boundary as stated above is to obtain frequency diversity. The term 'ZC sequence offset' as used herein indicates one code resource. That is, the ZC sequence has a property that there is orthogonality between sequences generated by cyclic-shifting one given ZC sequence by differentiating their offsets, making it possible to generate multiple codes (sequences). Therefore, the expression 'differentiating an offset value' may mean 'using different codes'.

The occasion shown by reference numerals 305 to 308 in FIG. 3 will be described with reference to one more example.

In the occasion shown by reference numeral 306, a control channel index (control channel ID) #7 is transmitted using time resources corresponding to 7 SC-FDMA symbols of the first slot, using code resource of a ZC sequence offset #2, and using frequency resource corresponding to a subband #1. In the occasion shown by reference numeral 307, a control channel index (control channel ID) #7 is transmitted using time resources corresponding to 7 SC-FDMA symbols of the second slot, using code resource of a ZC sequence offset #2, and using frequency resource a subband #(N−2).

Control information is transmitted from multiple terminals in the method shown by reference numerals 305 to 308 of FIG. 3. For example, the control information is transmitted over the uplink in such a manner that a terminal #1 transmits its control information through a control channel index #1, and a terminal #2 transmits its control information through a control channel index #2.

It can be appreciated from the foregoing description that different control channels use the resources which are orthogonal with each other. That is, since the different control channels use different time resources, frequency resources and code resources, and there is orthogonality between the codes, there is no interference between the control channels in the ideal environment.

Actually, however, since the orthogonal property is not perfect due to a multi-path phenomenon, a Doppler effect, etc. existing in the wireless channel environment, interference may occur between the control channels. In addition, it is general that the orthogonality is not satisfied between the time and code resources used between different cells, causing occurrence of interference.

Regarding the scheme described in FIG. 3, in the environment where interference occurs between control channels or between neighboring cells, when its load is concentrated upon any one subband, there is an inefficiency problem.

For example, let's assume that in a particular subframe, control channels #0~#5 are all transmitted, but only the control channel #6 among control channels #6~#11 is transmitted. In this case, the control channel #6 has no interference from other control channels in terms of inter-code interference, but the control channels #0~#5 may give interference to each other. Generally, it is not possible to prevent the load concentration on a particular subband, and the same problem may occur even in the second slot.

SUMMARY OF THE INVENTION

An aspect of the present invention is to address at least the problems and/or disadvantages and to provide at least the advantages described below. Accordingly, an aspect of the present invention is to provide a method and apparatus capable of distributing interference between control channels in the uplink.

According to one aspect of the present invention, there is provided a method for transmitting an uplink control channel at a terminal in a Single Carrier Frequency Division Multiple Access (SC-FDMA)-based mobile communication system. The transmission method includes receiving a control channel index allocated from a base station; transmitting control information at every symbol through a subband and a Zadoff-Chue sequence offset resource, which are mapped to the control channel index according to a first grouping rule; and transmitting control information through a subband and a Zadoff-Chue sequence offset resource, which are mapped to the control channel index according to a second grouping rule, beginning from a symbol after a slot boundary.

According to another aspect of the present invention, there is provided a method for receiving an uplink control channel at a base station in a Single Carrier Frequency Division Multiple Access (SC-FDMA)-based mobile communication system. The reception method includes allocating control channel indexes to more than one terminals; receiving control information at every symbol through a subband and a Zadoff-Chue sequence offset resource, which are mapped to the control channel index according to a first mapping rule; and receiving control information transmitted through a subband and a Zadoff-Chue sequence offset resource, which are mapped to the control channel index according to a second mapping rule, beginning from a symbol after a slot boundary.

According to further another aspect of the present invention, there is provided an apparatus for transmitting an uplink control channel at a terminal in a Single Carrier Frequency Division Multiple Access (SC-FDMA)-based mobile communication system. The transmission apparatus includes a channel encoder for channel-encoding a specific control information bit stream; a channel interleaver for performing channel interleaving on input control information output from the channel encoder; a modulator for modulating the control information output from the channel interleaver; a sequence mapper for mapping the modulated control information to Zadoff-Chue sequence offset resource; a sub-carrier mapper for mapping the control information output from the sequence mapper to a sub-carrier; a controller for controlling the sequence mapper and the sub-carrier mapper so that control information is transmitted at every symbol through a subband and a Zadoff-Chue sequence offset resource, which are mapped to the control channel index according to a first grouping rule, and control information is transmitted through a subband and a Zadoff-Chue sequence offset resource, which are mapped to the control channel index according to a second grouping rule, beginning from a symbol after a slot boundary; and a transmission unit for converting a signal output from the sub-carrier mapper into a radio signal.

According to yet another aspect of the present invention, there is provided an apparatus for receiving an uplink control channel at a base station in a Single Carrier Frequency Division Multiple Access (SC-FDMA)-based mobile communication system. The reception apparatus includes a reception unit for receiving a control channel transmitted from at least one terminal; a sub-carrier demapper for extracting a sub-carrier mapped to the control channel output from the reception unit; a sequence mapper for extracting control information mapped to a Zadoff-Chue sequence offset resource from the extracted sub-carrier; a controller for controlling the sequence demapper and the sub-carrier demapper so that control information is extracted at every symbol through a subband and a Zadoff-Chue sequence offset resource, which are mapped to the control channel index according to a first grouping rule, and control information is extracted through a subband and a Zadoff-Chue sequence offset resource, which are mapped to the control channel index according to a second grouping rule, beginning from a symbol after a slot boundary; a demodulator for demodulating control information output from the sequence demapper; a channel deinterleaver for performing channel deinterleaving on input control information output from the demodulator; and a channel encoder for channel-decoding a signal output from the channel deinterleaver, and outputting a specific control information bit stream.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Although a description of the detailed embodiment for control channel transmission/reception will be given herein with reference to uplink transmission in the mobile communication system to which Single Carrier Frequency Division Multiple Access (SC-FDMA) is applied, it should be noted that the operating principle of the present invention is not limited to a particular transmission system, or to the transmission direction (uplink or downlink) of control information.

Figure 4:
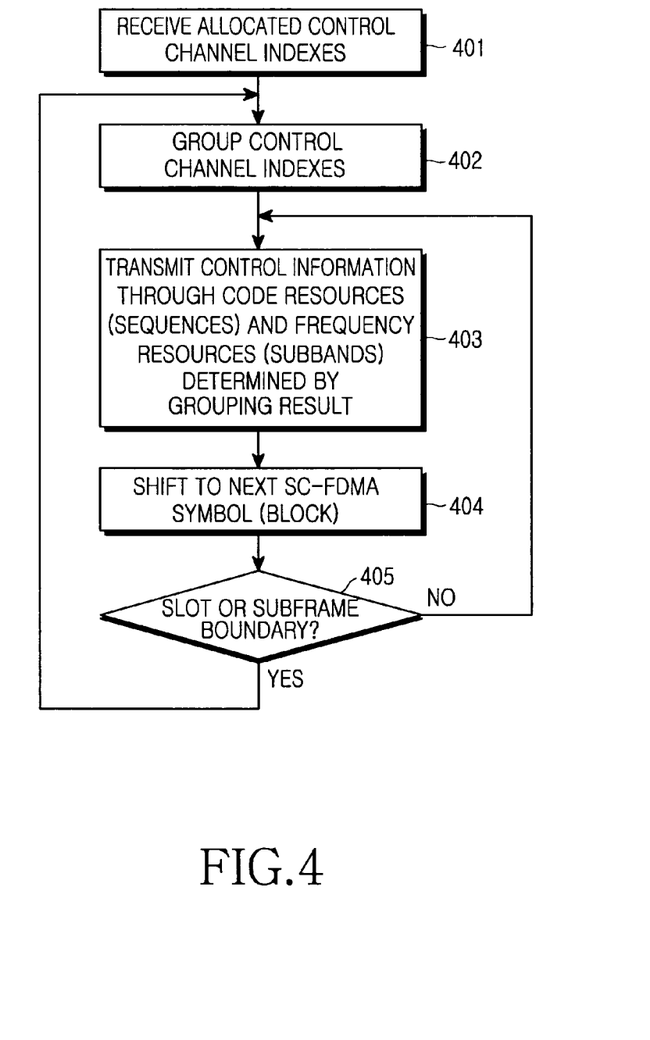
FIG. 4 is a flowchart illustrating a transmitter's operation of performing uplink transmission at a terminal according to a preferred embodiment of the present invention.

FIG. 4 is a flowchart illustrating a transmitter's operation of performing uplink transmission at a terminal according to a preferred embodiment of the present invention.

In step 401, a transmitter is allocated, from a base station, a control channel index it will use for transmission of control information. Since there are various methods by which the transmitter is allocated the control channel index, the present invention is not limited to a particular allocation method. After being allocated the control channel index, the transmitter should determine which code resource and frequency resource are mapped to its allocated control channel index. To this end, the transmitter groups, in step 402, control channel indexes included in a predetermined set according to a scheme previously agreed upon with the base station.

Figure 5:
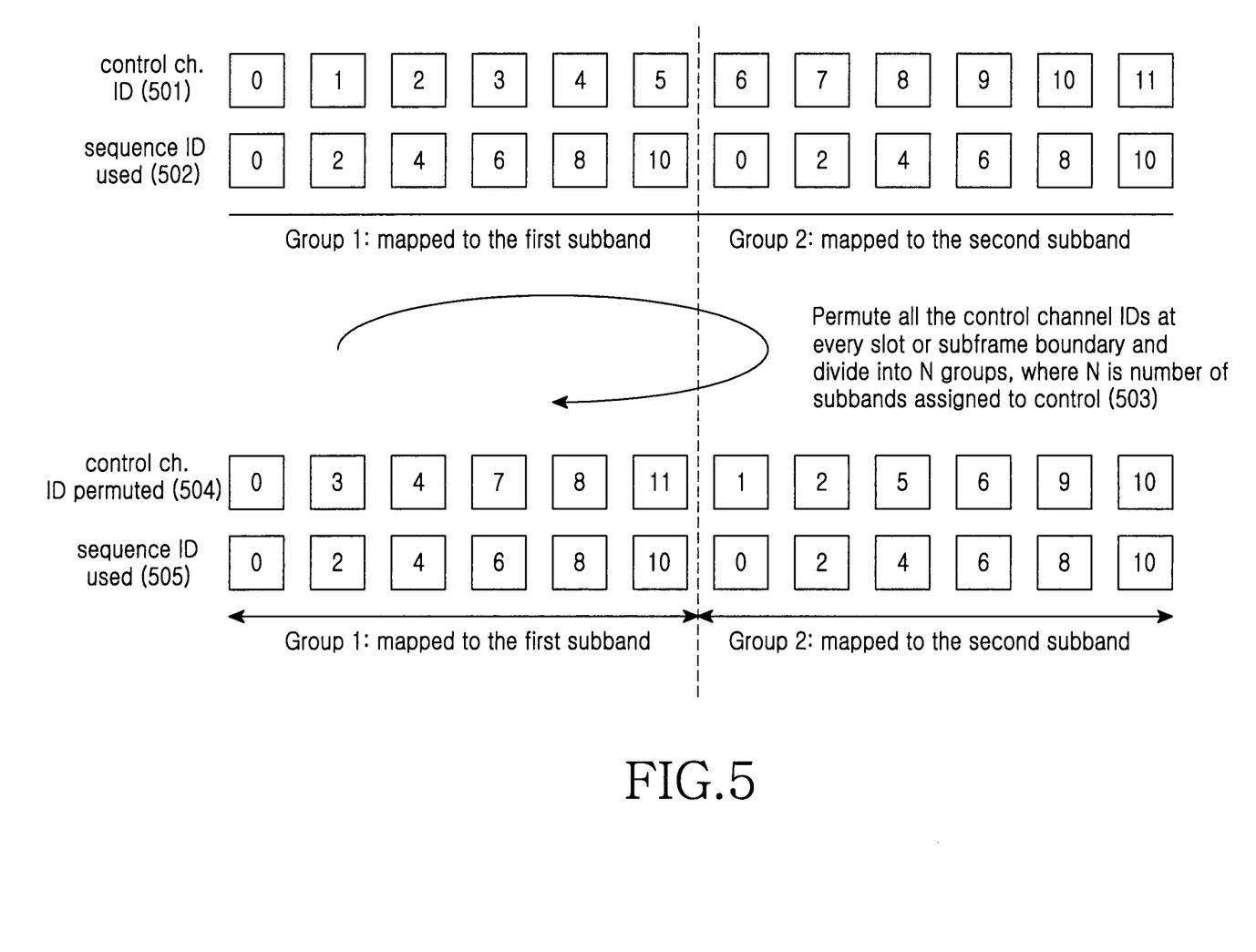
FIG. 5 is a diagram illustrating an example of grouping control channel indexes according to a preferred embodiment of the present invention.

The grouping operation will be described in detail with reference to FIG. 5, by way of example. Referring to FIG. 5, the control channel indexes included in the set are assumed to be control channel indexes 0, 1, 2, ..., 11. Assuming that all the control channel indexes use two subbands as frequency resources, the control channel indexes are divided into two groups. For example, as shown by reference numeral 501, control channel indexes corresponding to the first group are 0, 1, 2, 3, 4 and 5, and control channel indexes corresponding to the second group are 6, 7, 8, 9, 10 and 11. When the groups are determined in this way, each group uses a different subband resource. In each subband resource, orders of code resources are predetermined, and in FIG. 5, orders of code resources are 0, 2, 4, 6, 8 and 10. That is, the control channel indexes 0, 1, 2, 3, 4 and 5 corresponding to the first group use code resource indexes 0, 2, 4, 6, 8 and 10, respectively, and also use frequency resource corresponding to the first subband. In addition, the control channel indexes 6, 7, 8, 9, 10 and 11 corresponding to the second group use code resource index 0, 2, 4, 6, 8 and 10, respectively, and also use frequency resource corresponding to the subband.

When the grouping on the control channel indexes is achieved, the transmitter transmits, in step 403, control information through the code resource and frequency resource determined as a result of the grouping. For example, with reference to FIG. 5, when its allocated control channel index is 1, the transmitter transmits the control information through resource corresponding to a sequence index #2 of the first subband. Thereafter, in step 404, the transmitter goes to the next SC-FDMA symbol. The transmitter determines in step 405 whether the SC-FDMA symbol corresponds to a boundary of one slot. If it is determined in step 405 that the SC-FDMA symbol does not correspond to the boundary of one slot, i.e., if the SC-FDMA symbol does not correspond to a first SC-FDMA symbol of a new slot, passing by the boundary of the slot, the transmitter proceeds to step 403 where it transmits the control information through the same code resource and frequency resource. However, if it is determined in step 405 that the SC-FDMA symbol corresponds to the first SC-FDMA symbol of a new slot, passing by the boundary of the slot, the transmitter proceeds to step 402 where it re-performs the grouping operation in the above-stated manner. It should be noted herein that the grouping result is basically changed every time the grouping operation is performed.

That is, the detailed example will be described with reference to FIG. 5. Let's assume that after the control channel indexes 0, 1, 2, 3, ..., 11 undergo interleaving as shown by reference numeral 503, the resulting control channel indexes are 0, 3, 4, 7, 8, 11, 1, 2, 5, 6, 9 and 10 as shown by reference numeral 504.

If it is assumed that the resulting control channel indexes are divided into a first group of the first 6 control channel indexes 0, 3, 4, 7, 8 and 11, a second group of the second 6 control channel indexes 1, 2, 5, 6, 9 and 10, the control channel indexes 0, 3, 4, 7, 8 and 11 corresponding to the first group use code resource indexes 0, 2, 4, 6, 8 and 10, respectively, and also use frequency resource corresponding to the first subband. In addition, the control channel indexes 1, 2, 5, 6, 9 and 10 corresponding to the second group use code resource indexes 0, 2, 4, 6, 8 and 10, respectively, and also use frequency resource corresponding to the second subband. Of course, it should also be noted that the detailed subband indexes for the first subband and the second subband are subject to change due to frequency hopping described above.

When its allocated control channel index is 1 as stated above, the transmitter transmits the control information through resource corresponding to a sequence index #0 of the second subband.

As described above, the present invention can enable load distribution (or load sharing) between subbands in the slot boundary through regrouping at the slot boundary, thereby reducing non-uniformity of interference and contributing to performance improvement.

The present invention proposes to perform the proposed grouping operation and a change in subband resources therethrough only at the slot boundary, instead of performing the grouping operation and the change in subband resources at every SC-FDMA symbol, and its reason is as follows.

If the grouping operation and the change in subband resources therethrough are made at every SC-FDMA symbol, a subband used for transmission of one control channel changes even during one slot, and in order to support this, pilot signals for channel estimation should be transmitted through multiple subbands. In this case, pilot overhead increases, causing a reduction in transmission performance.

Figure 6:
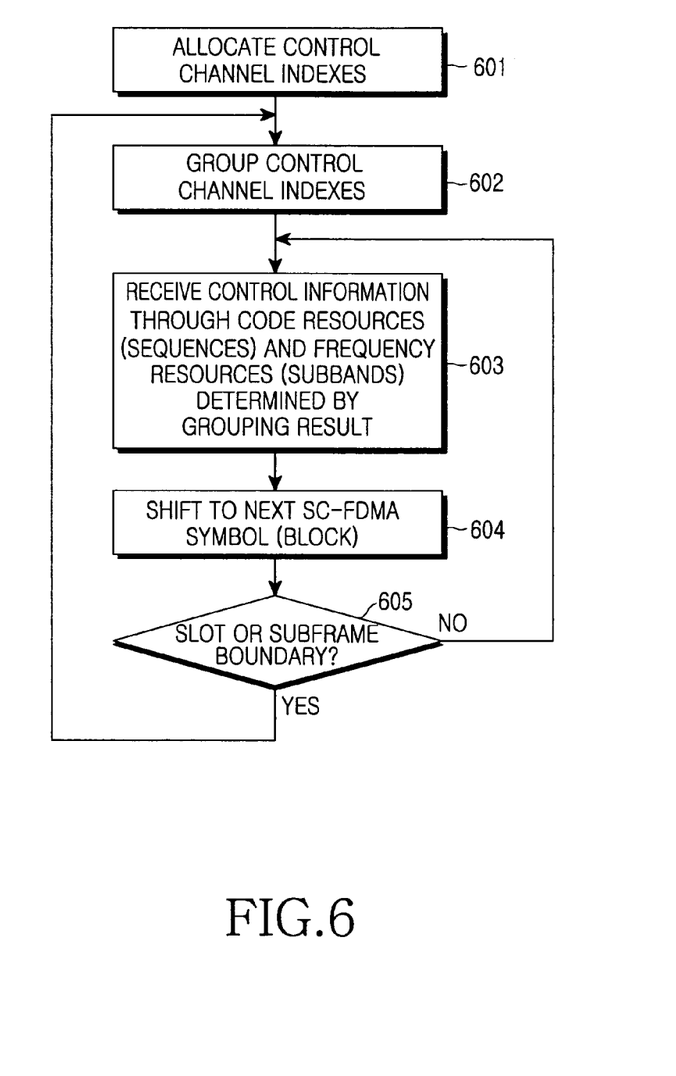
FIG. 6 is a flowchart illustrating a receiver's operation of a base station according to a preferred embodiment of the present invention.

FIG. 6 is a flowchart illustrating a receiver's operation of a base station according to a preferred embodiment of the present invention.

Referring to FIG. 6, in step 601, a receiver allocates, to a transmitter, a control channel index that the transmitter will use. After allocating the control channel index, the receiver groups control channel indexes included in a predetermined set in step 602. Since the grouping operation and its detailed rule are equal to those of the transmitter, a detailed description thereof will be omitted herein.

When the grouping on the control channel indexes are performed as stated above, the receiver receives control information through the code resource and frequency resource determined by the grouping result, in step 603, and then goes to the next SC-FDMA symbol in step 604. The receiver determines in step 605 whether the SC-FDMA symbol corresponds to a boundary of one slot. If it is determined in step 605 that the SC-FDMA symbol corresponds to the boundary of one slot, i.e., if the SC-FDMA symbol does not correspond to a first SC-FDMA symbol of a new slot, passing by the boundary of the slot, the receiver proceeds to step 603 where it receives control information through the same code resource and frequency resource. However, if it is determined in step 605 that the SC-FDMA symbol corresponds to the first SC-FDMA symbol of a new slot, passing by the boundary of the slot, the receiver proceeds to step 602 where it re-performs the grouping operation.

Figure 7:
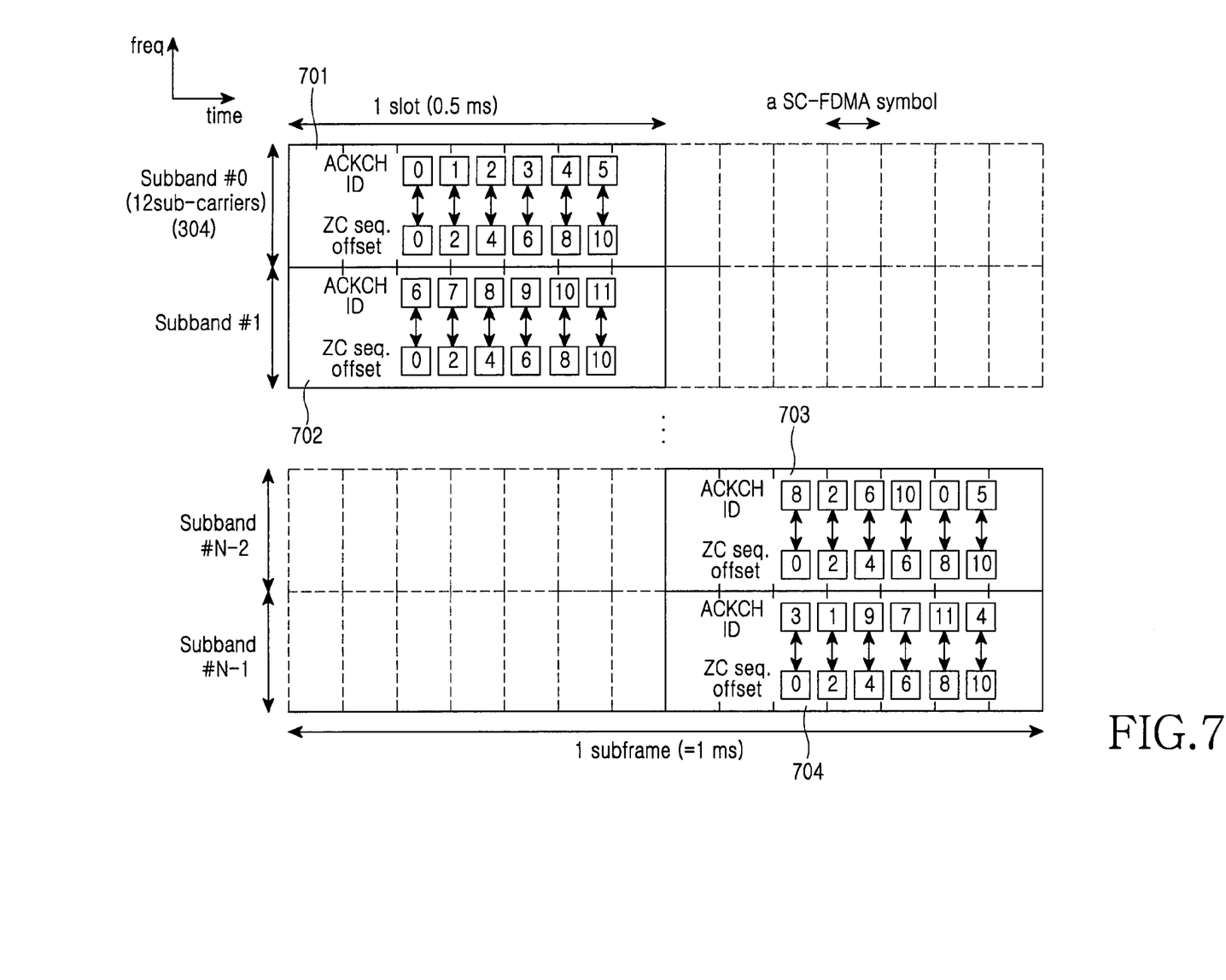
FIG. 7 is a diagram illustrating a detailed example of time resources, frequency resources and code resources according to a preferred embodiment of the present invention.

FIG. 7 is a diagram illustrating a detailed example of the time resources, frequency resources and code resources described with reference to FIGS. 4 and 5 according to the present invention.

Referring to FIG. 7, reference numerals 701 to 704 show through which time resource, frequency resource and code resource each control channel index is transmitted, according to the method proposed by the present invention.

In the occasion shown by reference numeral 701, in the first slot, control channel indexes 0, 1, 2, 3, 4 and 5 corresponding to the first group are transmitted using time resources corresponding to 7 slots corresponding to the first slot, using code resource indexes 0, 2, 4, 6, 8 and 10, respectively, and using frequency resource corresponding to a subband #0. Further, in the occasion shown by reference numeral 702, in the first slot, control channel indexes 6, 7, 8, 9, 10 and 11 corresponding to the first group are transmitted using time resources corresponding to 7 slots corresponding to the first slot, using code resource indexes 0, 2, 4, 6, 8 and 10, respectively, and using frequency resource corresponding to a subband #1.

In FIG. 7, at a boundary between the first slot and the second slot, the grouping operations described in FIGS. 4 and 5 are perform, and as a result of the grouping, control channel indexes corresponding to the first group are 8, 2, 6, 10, 0 and 5, and control channel indexes corresponding to the second group are 3, 1, 9, 7, 11 and 4. According to the result, in the occasion shown by reference numeral 703, in the second slot, control channel indexes 8, 2, 6, 10, 0 and 5 corresponding to the first group are transmitted using time resources corresponding to 7 slots corresponding to the second slot, using code resource indexes 0, 2, 4, 6, 8 and 10, respectively, and using frequency resource corresponding to a subband #(N−2). Further, in the occasion shown by reference numeral 704, in the second slot, control channel indexes 3, 1, 9, 7, 11 and 4 corresponding to the second group are transmitted using time resources corresponding to 7 slots corresponding to the second slot, using code resource indexes 0, 2, 4, 6, 8 and 10, respectively, using frequency resource corresponding to a subband #(N−1).

Figure 8:
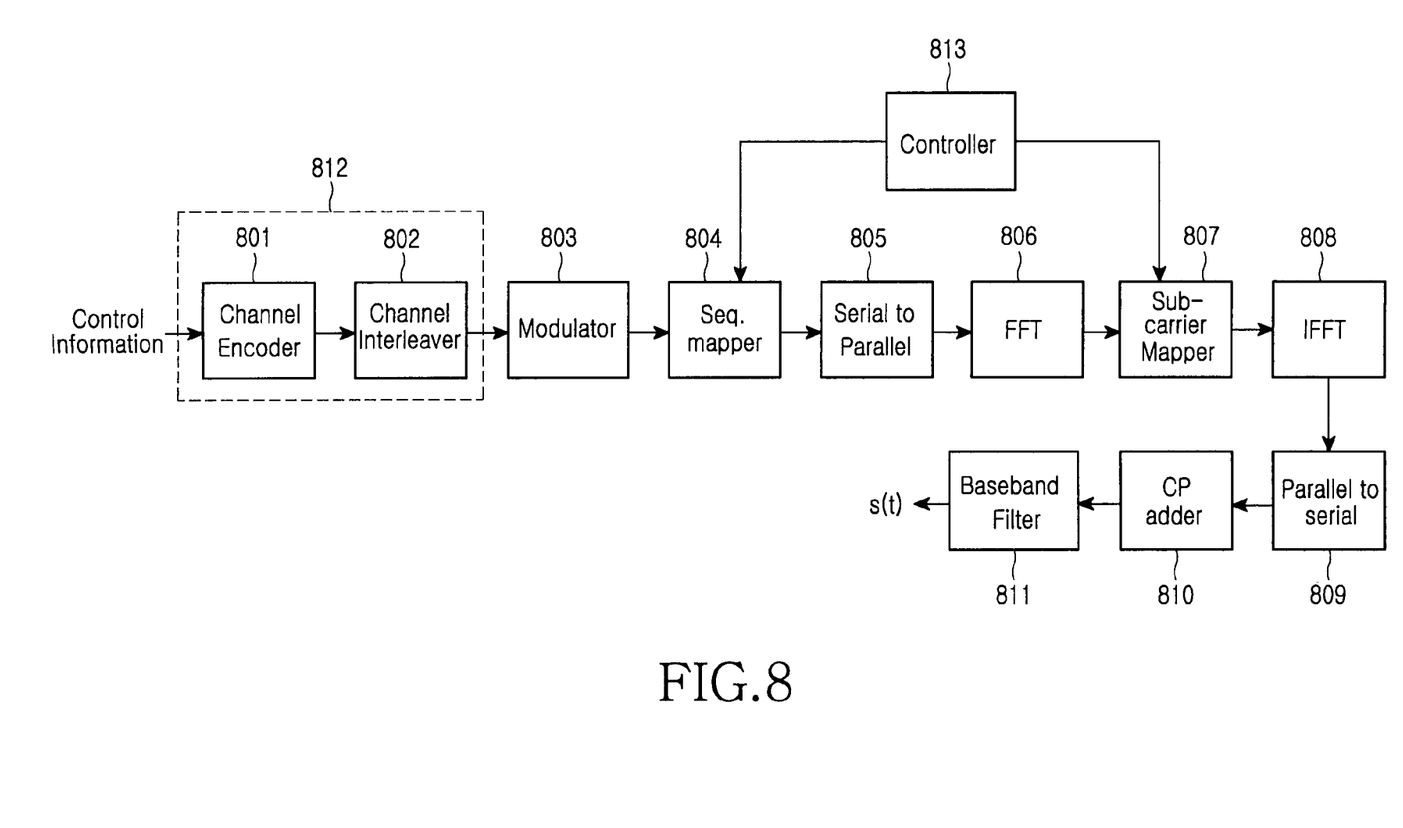
FIG. 8 is a block diagram illustrating an internal structure of a terminal's transmitter for transmitting uplink control channels according to a preferred embodiment of the present invention.

FIG. 8 is a block diagram illustrating an internal structure of a terminal's transmitter for performing transmission of uplink control channels according to a preferred embodiment of the present invention.

Referring to FIG. 8, a channel encoder 801 performs a predetermined channel encoding process on an input information bit stream. A block encoder, a convolutional encoder, a turbo encoder or a Low Density Parity Check (LDPC) encoder can be used as the channel encoder 801. A channel interleaver 802 performs predetermined channel interleaving on the input signal output from the channel encoder 801. A block indicated by reference numeral 812 can be replaced with another block according to the type of the control information. For example, when transmitting 1-bit control information such as ACK/NACK feedback, the block 812 can be replaced with a repeater.

A modulator 803 performs a modulation process, such as QPSK, 8PSK, 16QAM, etc., on the input signal output from the channel interleaver 802. The output of the modulator 803 is mapped to particular code resources in a sequence mapper 804. The serial output of the sequence mapper 804 is input to a serial-to-parallel converter 805 where it is converted into a parallel signal. The output of the serial-to-parallel converter 805 undergoes FFT transform by means of an FFT unit 806. A sub-carrier mapper 807 maps the FFT-transformed signal to sub-carriers according to a predetermined rule so that the signal of the terminal should occupy only a particular frequency. An IFFT unit 808 IFFT-transforms the signal output from the sub-carrier mapper 807, and a parallel-to-serial converter 809 converts the parallel input signal into a serial signal. A CP adder 810 adds a CP to the signal output from the parallel-to-serial converter 809 according to a predetermined rule, and then, a final baseband signal s(t) is generated by means of a baseband filter 811.

A controller 813 controls the sequence mapper 804 and the sub-carrier mapper 807 so that the code resource and frequency resource allocation method described in FIG. 4 can be applied thereto.

Figure 9:
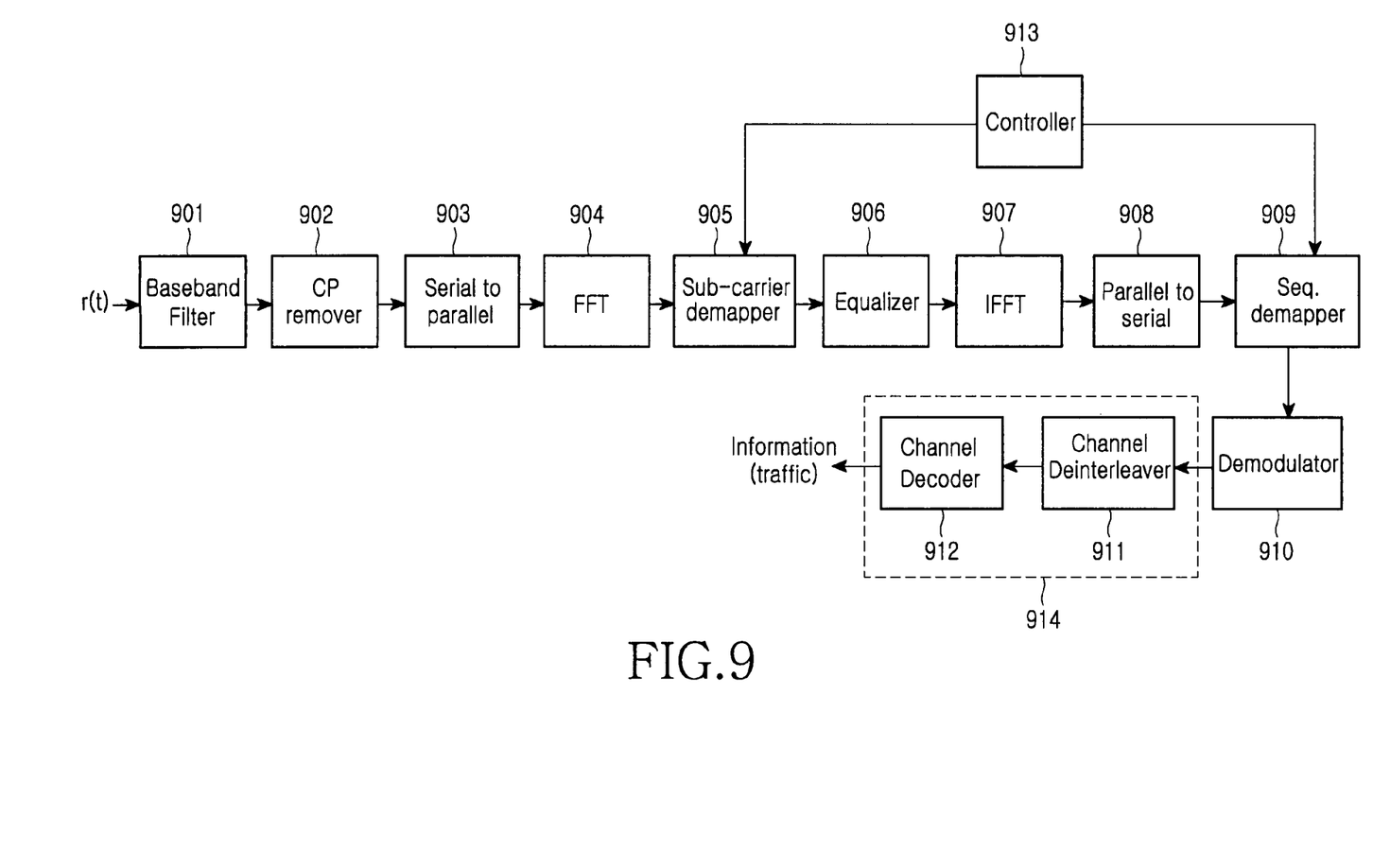
FIG. 9 is a block diagram illustrating a structure of a base station's receiver for receiving uplink control channels according to a preferred embodiment of the present invention.

FIG. 9 is a block diagram illustrating a structure of a base station's receiver for receiving uplink control channels according to a preferred embodiment of the present invention.

Referring to FIG. 9, a received signal r(t) is output through baseband filter 901. Generally, baseband filter 201 makes a pair with the baseband filter 811 of FIG. 8. The output of the baseband filter 901 is input to a CP remover 902 where a CP part is removed therefrom according to a predetermined rule, and the output of the CP remover 902 is input to a serial-to-parallel converter 903 where it is converted into a parallel signal. The output of the serial-to-parallel converter 903 undergoes FFT transform in an FFT unit 904, and then input to a sub-carrier demapper 905. The sub-carrier demapper 905 extracts the sub-carriers mapped by the sub-carrier mapper 807 of FIG. 8. The extracted sub-carriers are input to a channel equalizer 906 where it undergoes a predetermined channel equalization process. The output of the channel equalizer 906, after passing through the IFFT unit 907, is input to a parallel-to-serial converter 908 where it is converted into a serial signal.

A sequence demapper 909 extracts the signal received through the code resources with which it should receive the control channel, and the extracted signal is input to a demodulator 910 where it undergoes a predetermined demodulation process corresponding to 16QAM, 8PSK, QPSK, etc. The output of the demodulator 910 is input to a channel deinterleaver 911 where it undergoes a predetermined deinterleaving process. The output of the channel deinterleaver 911 is input to a channel decoder 912 where it undergoes a predetermined channel decoding process, detecting the final information.

The channel deinterleaver 911 and the channel decoder 912 may be omitted according to the type of the information transmitted over the control channel. A controller 913 controls the sub-carrier demapper 905 and the sequence demapper 909 so that the reception operation described in FIG. 6 can be performed.

As is apparent from the foregoing description, the application of the control channel transmission method proposed by the present invention can prevent control channels from being transmitted at a particular subband in a particular subframe on a concentrated basis, thereby distributing interference between control channels and contributing to receive performance of the control channels.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting an uplink control channel at a terminal in a Single Carrier Frequency Division Multiple Access (SC-FDMA)-based mobile communication system, the method comprising:
   receiving a control channel index allocated from a base station;
   transmitting control information at every symbol using a first subband and a first Zadoff-Chue sequence offset resource, the first subband and the first Zadoff-Chue sequence offset resource being mapped to the control channel index according to a first grouping rule; and
   transmitting control information using a second subband and a second Zadoff-Chue sequence offset resource, the second subband and the second Zadoff-Chue sequence offset resource being mapped to the control channel index according to a second grouping rule, beginning from a symbol after a slot boundary.

2. The method of claim 1, wherein the first grouping rule permutes control channel indexes allocated to terminals according to a predetermined criterion, classifies the permuted control channel indexes into groups, a number of the groups being equal to a number of subbands available in a current slot, and maps the Zadoff-Chue sequence offset to the permuted control channel index in each of the groups.

3. The method of claim 2, wherein the second grouping rule re-permutes the control channel indexes in a different order from an order in which the control channel indexes are permuted according to the first grouping rule.

4. A method for receiving an uplink control channel at a base station in a Single Carrier Frequency Division Multiple Access (SC-FDMA)-based mobile communication system, the method comprising:
   allocating control channel indexes to one or more terminals;
   receiving control information at every symbol using a first subband and a first Zadoff-Chue sequence offset resource, the first subband and the first Zadoff-Chue sequence offset resource being mapped to the control channel index according to a first mapping rule; and
   receiving control information transmitted using a second subband and a second Zadoff-Chue sequence offset resource, the second subband and the second Zadoff-Chue sequence offset resource being mapped to the control channel index according to a second mapping rule, beginning from a symbol after a slot boundary.

5. The method of claim 4, wherein the first grouping rule permutes control channel indexes allocated to the terminals according to a predetermined criterion, classifies the permuted control channel indexes into groups, a number of the groups being equal to a number of subbands available in a current slot, and maps the Zadoff-Chue sequence offset to the permuted control channel index in each of the groups.

6. The method of claim 5, wherein the second grouping rule re-permutes the control channel indexes in a different order from an order in which the control channel indexes are permuted according to the first grouping rule.

7. An apparatus for transmitting an uplink control channel at a terminal in a Single Carrier Frequency Division Multiple Access (SC-FDMA)-based mobile communication system, the apparatus comprising:
   a transmission unit;
   a reception unit for receiving a control channel index allocated from a base station; and
   a controller for controlling the transmission unit so that control information is transmitted at every symbol using a first subband and a first Zadoff-Chue sequence offset resource, the first subband and the first Zadoff-Chue sequence offset resource being mapped to the control channel index according to a first grouping rule, and control information is transmitted using a second subband and a second Zadoff-Chue sequence offset resource, the second subband and the second Zadoff-Chue sequence offset resource being mapped to the control channel index according to a second grouping rule, beginning from a symbol after a slot boundary.

8. The apparatus of claim 7, wherein the first grouping rule permutes control channel indexes allocated to terminals according to a predetermined criterion, classifies the permuted control channel indexes into groups, a number of the groups being equal to a number of subbands available in a current slot, and maps the Zadoff-Chue sequence offset to the permuted control channel index in each of the groups.

9. The apparatus of claim 8, wherein the second grouping rule re-permutes the control channel indexes in a different order from an order in which the control channel indexes are permuted according to the first grouping rule.

10. An apparatus for receiving an uplink control channel at a base station in a Single Carrier Frequency Division Multiple Access (SC-FDMA)-based mobile communication system, the apparatus comprising:
   a controller for allocating control channel indexes to one or more terminals;
   a reception unit for receiving control information at every symbol transmitted using a first subband and a first Zadoff-Chue sequence offset resource, the first subband and the first Zadoff-Chue sequence offset resource being mapped to the control channel index according to a first grouping rule, and receiving control information transmitted using a second subband and a second Zadoff- Chue sequence offset resource, the second subband and the second Zadoff-Chue sequence offset resource being mapped to the control channel index according to a second grouping rule, beginning from a symbol after a slot boundary.

11. The apparatus of claim 10, wherein the first grouping rule permutes control channel indexes allocated to the terminals according to a predetermined criterion, classifies the permuted control channel indexes into groups, a number of the groups being equal to a number of subbands available in a current slot, and maps the Zadoff-Chue sequence offset to the permuted control channel index in each of the groups.

12. The apparatus of claim 11, wherein the second grouping rule re-permutes the control channel indexes in a different order from an order in which the control channel indexes are permuted according to the first grouping rule.

* * * * *